United States Patent
Khosravi et al.

(10) Patent No.: US 8,938,610 B2
(45) Date of Patent: Jan. 20, 2015

(54) COMPUTING DEVICE AND METHOD FOR WIRELESS REMOTE BOOT IN A NETWORKED ENVIRONMENT

(71) Applicant: Intel Corporation, Santa Clara, CA (US)

(72) Inventors: Hormuzd M. Khosravi, Portland, OR (US); Venkat R Gokulrangan, Portland, OR (US); Michael Berger, Jerusalem (IL); Izoslav Tchigevsky, Kiryat Haim (IL); Gary Joe Calhoun, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/060,289

(22) Filed: Oct. 22, 2013

(65) Prior Publication Data

US 2014/0047230 A1    Feb. 13, 2014

Related U.S. Application Data

(62) Division of application No. 12/623,555, filed on Nov. 23, 2009, now abandoned.

(51) Int. Cl.
| | | |
|---|---|---|
| *G06F 9/00* | (2006.01) | |
| *G06F 15/177* | (2006.01) | |
| *G06F 9/44* | (2006.01) | |
| *H04W 99/00* | (2009.01) | |

(52) U.S. Cl.
CPC ............ *G06F 9/4416* (2013.01); *H04W 99/00* (2013.01)
USPC .................. 713/2; 713/1; 709/217; 709/218; 709/219; 709/222

(58) Field of Classification Search
USPC .................. 713/1, 2; 709/217, 218, 219, 222
See application file for complete search history.

(56) References Cited

U.S. PATENT DOCUMENTS

| | | |
|---|---|---|
| 7,406,591 B2 | 7/2008 | Rothman et al. |
| 7,865,775 B2 | 1/2011 | Yao et al. |
| 7,917,743 B2 | 3/2011 | Martinez et al. |
| 2003/0200428 A1 | 10/2003 | Chan et al. |
| 2009/0070467 A1* | 3/2009 | Khosravi et al. ............... 709/225 |
| 2009/0129597 A1* | 5/2009 | Zimmer et al. ............... 380/277 |
| 2009/0249120 A1 | 10/2009 | Yao et al. |
| 2009/0276620 A1 | 11/2009 | Mccarron et al. |
| 2010/0268928 A1 | 10/2010 | Wang et al. |

(Continued)

OTHER PUBLICATIONS

"U.S. Appl. No. 12/623,555, Examiner Interview Summary mailed Sep. 11, 2013", 3 pgs.

(Continued)

*Primary Examiner* — Jaweed A Abbaszadeh
(74) *Attorney, Agent, or Firm* — Schwegman Lundberg & Woessner, P.A.

(57) ABSTRACT

In some embodiments, a secure authenticated remote boot of computing device over a wireless network is performed in a pre-boot execution environment (PXE) using active management technology (AMT) for remote discovery. In these embodiments, a management engine (ME) may maintain full control of a wireless interface and a wireless connection as booting begins. The ME may relinquish control of the wireless interface after a PXE timeout, in response to a shutdown command, or once the device has booted. The ME controls the use of an operating system received from a remote location.

14 Claims, 8 Drawing Sheets

(56) References Cited

U.S. PATENT DOCUMENTS

2010/0306359 A1* 12/2010 Dehaan et al. ............... 709/223
2011/0125990 A1    5/2011 Khosravi et al.

OTHER PUBLICATIONS

"U.S. Appl. No. 12/623,555, Final Office Action mailed May 1, 2013", 9 pgs.
"U.S. Appl. No. 12/623,555, Non Final Office Action mailed Aug. 7, 2012", 9 pgs.
"U.S. Appl. No. 12/623,555, Preliminary Amendment filed Apr. 6, 2010", 6 pgs.
"U.S. Appl. No. 12/623,555, Response filed Jan. 2, 2013 to Non Final Office Action mailed Aug. 7, 2012", 10 pgs.
"U.S. Appl. No. 12/623,555, Response filed May 22, 2012 to Restriction Requirement mailed Apr. 27, 2012", 6 pgs.
"U.S. Appl. No. 12/623,555, Response filed Sep. 24, 2013 to Final Office Action mailed May 1, 2013", 9 pgs.
"U.S. Appl. No. 12/623,555, Restriction Requirement mailed Apr. 27, 2012", 7 pgs.

* cited by examiner

COMPUTING DEVICE AND METHOD FOR WIRELESS REMOTE BOOT IN A NETWORKED ENVIRONMENT

RELATED APPLICATION

This application is a divisional of U.S. application Ser. No. 12/623,555, filed Nov. 23, 2009, which is incorporated herein by reference in its entirety.

TECHNICAL FIELD

Some embodiments pertain to wireless devices. Some embodiments pertain to remote boots of computing devices.

BACKGROUND

An operating system may use a variety of sources to boot up in various environments. Networked systems allow a computing device to receive start up information from a network server. A Basic Input/Output System (BIOS) defines a firmware interface which is the first code run by a computing device when powered on. The BIOS loads the operating system, identifies, tests and initializes system devices. The BIOS prepares the computing device to operate in a known state so that software may be loaded, executed and given control of the device.

The state of a computing device is defined by a system image and is used by the BIOS. A computer system boots up by executing BIOS instructions that cause an operating system loader program to be loaded from a disk drive into system memory. The BIOS may then cause the computer system to execute the loader program that, in turn, causes the computer system to load portions of the operating system into the system memory. Subsequently, the operating system may execute one or more program(s) to initialize and start execution of the operating system.

Many computing devices are wireless devices that include a wireless adapter card for communicating within a wireless network. Wireless adapter cards may not have sufficient memory storage to store operating code and driver codes used to support wireless networked functionality. Thus what is needed are computing devices and methods that provide for wireless remote boot in a networked environment.

DETAILED DESCRIPTION

The following description and the drawings sufficiently illustrate specific embodiments to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments set forth in the claims encompass all available equivalents of those claims.

The following details some embodiments of a method and apparatus for a wireless remote boot, such as an Operating System (OS) streaming method, in a networked environment having access to a wireless network. In example embodiments, the method and apparatus utilize existing software and firmware instructions (e.g., code), as well as apparatus to retrieve information that may be used to enable networked boot up from a wireless network for a remote computing device. Such techniques may be implemented without additional memory to the wireless cards that implement the wireless connectivity for the computing device, such as wireless-fidelity (Wi-Fi) cards. Existing wireless cards may not have sufficient memory to store operating instructions (e.g., code) and driver codes to support wireless networked functionality.

Some embodiments leverage the central management functions of a central server to provide resources that allow wireless boot up of the computing device. By leveraging wireless network support built into a networked system, it is possible to allow a remote boot up from a wireless server without rebuilding the BIOS and other information used at boot up.

In some embodiments, a secure authenticated remote boot of computing device over a wireless network is performed in a pre-boot execution environment (PXE) using active management technology (AMT) for remote discovery. In these embodiments, a management engine (ME) may maintain full control of a wireless interface and a wireless connection as booting begins. The ME may relinquish control of the wireless interface after a PXE timeout, in response to a shutdown command, or once the device has booted. The ME controls the use of an operating system received from a remote location. These embodiments are described in more detail below.

In some embodiments, a host embedded controller interface (HECI) application programming interface (API) is used to communicate with the ME for communicating over the wireless connection, the HECI API to serve as a proxy for the wireless interface when managed by the ME. In some embodiments, a universal network driver interface (UNDI) is used as a host embedded controller interface (HECI) wrapper, the PXE to use the UNDI to communicate with the ME for communicating network traffic over the wireless connection. In some embodiments, the computing device is a wireless communication device configured to communicate in accordance with an IEEE 802.11 standard. In some embodiments, the computing device is a wireless communication device configured to communicate in accordance with an IEEE 802.16 standard. In some embodiments, the computing device is a wireless communication device configured to communicate in accordance with a 3GPP standard for long-term evolution (LTE).

Figure 1:
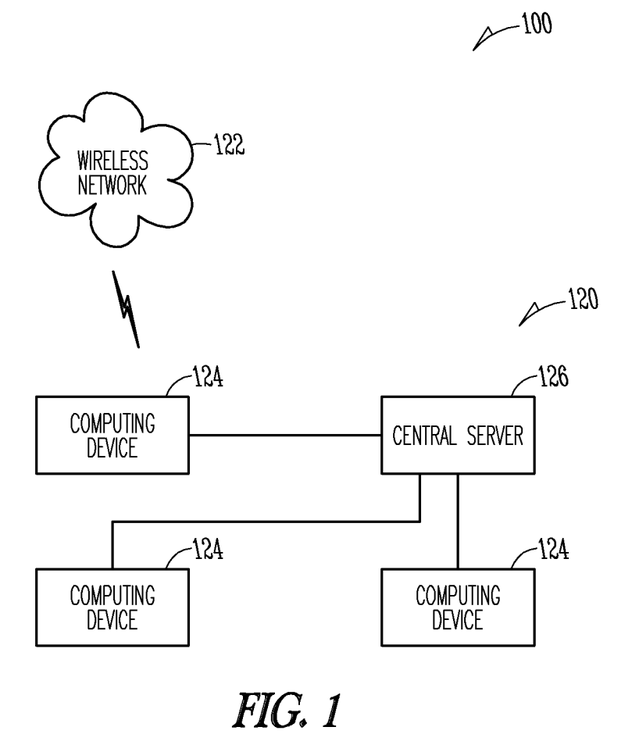
FIG. 1 illustrates a computer system in accordance with some example embodiments.

FIG. 1 illustrates a computer system 100, in accordance with example embodiments. The computer system 100 includes access to a wireless network 122, which may reside within computer system 100 or may be external. The computer system 100 also includes a local area network (LAN) 120. A central server 126 may be an enterprise server, a central server for implementing control, updates, and other maintenance of one or more of computing devices 124. The computer system 100 is configured to implement a remote network boot up for the computing devices 124 using resources of the central server 126. Some embodiments implement a PXE, which allows a remote computing device 124, such as a workstation, to boot from a server on a network prior to booting the operating system on the local hard drive of the computing device 124. The PXE specifies a process to load software onto the remote computing device 124 from the central server 126. Implementation of the PXE involves support components in a BIOS and NIC of the computing device 124. The PXE operates to boot the computing device 124 from the central server 126 by transferring the boot image file from the central server 126. The PXE works with the LAN 120 and works with multiple OSs.

Figure 2:
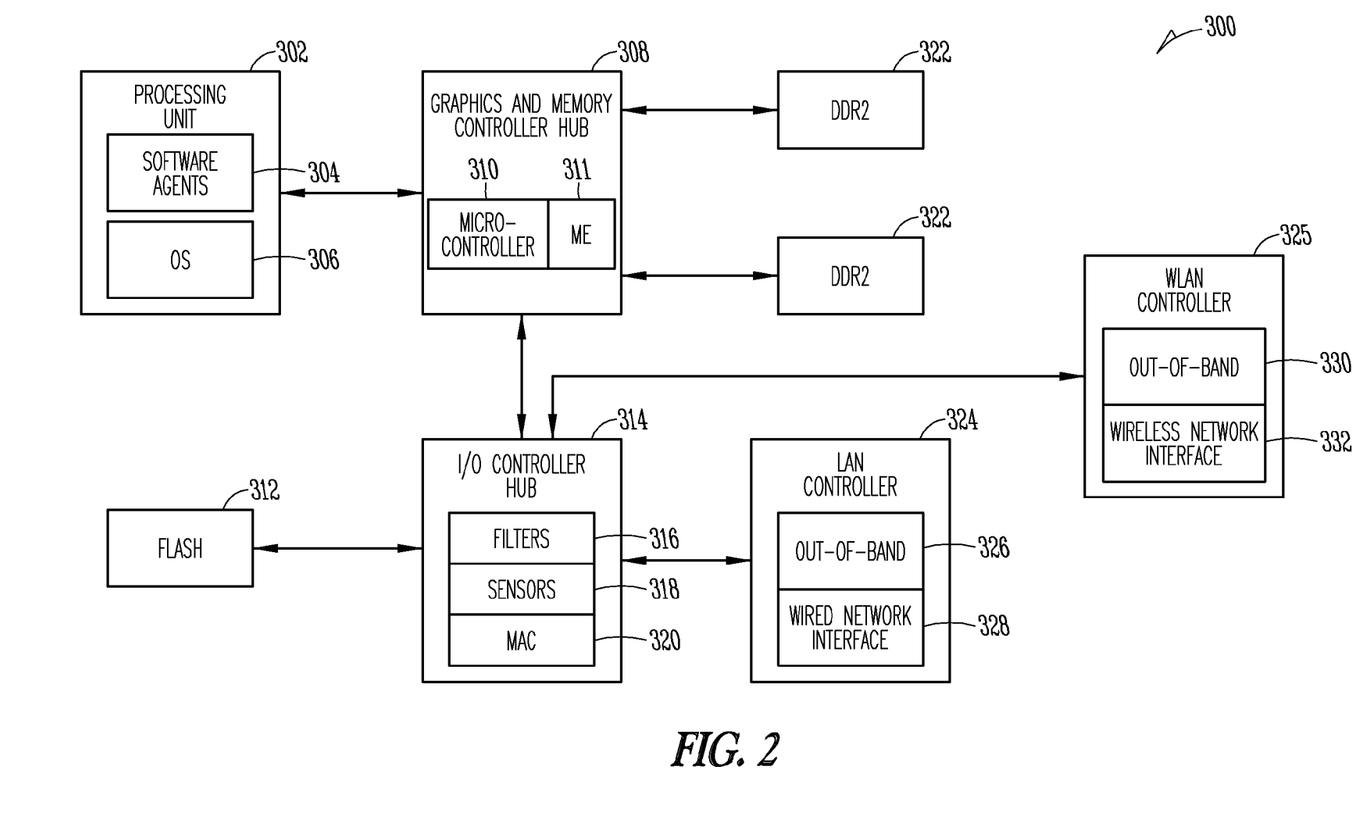
FIGS. 2-5 illustrate an Active Management Technology (AMT) core hardware architecture resident in a computing device in accordance with some example embodiments.

FIG. 2 illustrates a computer system 300 having an Active Management Technology (AMT) management mechanism for remote discovery, healing and protection of computer systems in accordance with some embodiments. In one embodiment, computer system 300 employs a silicon-resident AMT. The AMT provides the basis for software designs to address manageability issues, improve the efficiency of remote management and asset inventory functionality in third-party management software, safeguard functionality of agents from operating-system (OS) failure, power loss, and intentional or inadvertent client removal. The AMT allows the computer system 300 to remotely discover computing assets in multiple operational states. The computer system 300 stores hardware asset information, such as in FLASH memory, which may be read out even when the computer system 300 is powered off or has an inoperable OS. The AMT may also provide a general-purpose, non-volatile data store that accepts local or network-based storage commands to work with management or enterprise applications.

Furthermore, the AMT may remotely heal computing assets so as to provide a proactive alert notification of a system problem, even in situations where the computer system 300 is powered off. The AMT provides Out-Of-Band (OOB) access to remotely diagnose, control, and repair the computer system 300 after software, OS, or hardware failures. The AMT infrastructure may support the creation of setup and configuration interfaces for management applications, as well as network, security, and storage administration.

The hardware architecture of computer system 300 may be resident in firmware, and may include a processing unit, such a processing unit 302, a graphics and memory controller hub 308, an I/O controller hub 314 and a Local Area Network (LAN) controller 324. The processing unit 302 includes software agents 304 and code for an OS 306. The graphics and memory controller hub 308 includes a micro-controller 310, which stores and controls Management Engine (ME) 311 including firmware to implement various services on behalf of management applications. The computer system 300 further includes a FLASH memory 312, which stores the system BIOS for computer system 300. The system BIOS includes machine-readable code used by the ME, and a third-party data store (3PDS) that enables applications to store information as needed in non-volatile memory.

The I/O controller hub 314 includes filters 316, sensors 318 and Medium Access Control (MAC) layer controller 320, which are used to interface with I/O ports and control communications with the computer system 300. A LAN controller 324 is communicatively coupled to the I/O controller hub 314, and includes OOB unit 326 and wired network interface 328. Network interface 328 may be an Ethernet interface although this is not a requirement. A WLAN controller 325 is communicatively coupled to the I/O controller hub 314, and includes OOB unit 330 and wireless network interface 332. The computer system 300 includes multiple Double Data Rate (DDR) memory units, such as DDR2 322, to transfer data on rising and falling edges of a clock signal. Each DDR2 322 is communicatively coupled to the graphics and memory controller hub 308.

The AMT functionality further enables management applications to access client computers in a variety of states by accessing the radio in a wireless Network Interface Card (NIC). The NIC allows the computer system 300 to access a wireless network, such as wireless network 122 (FIG. 1).

Figure 3:
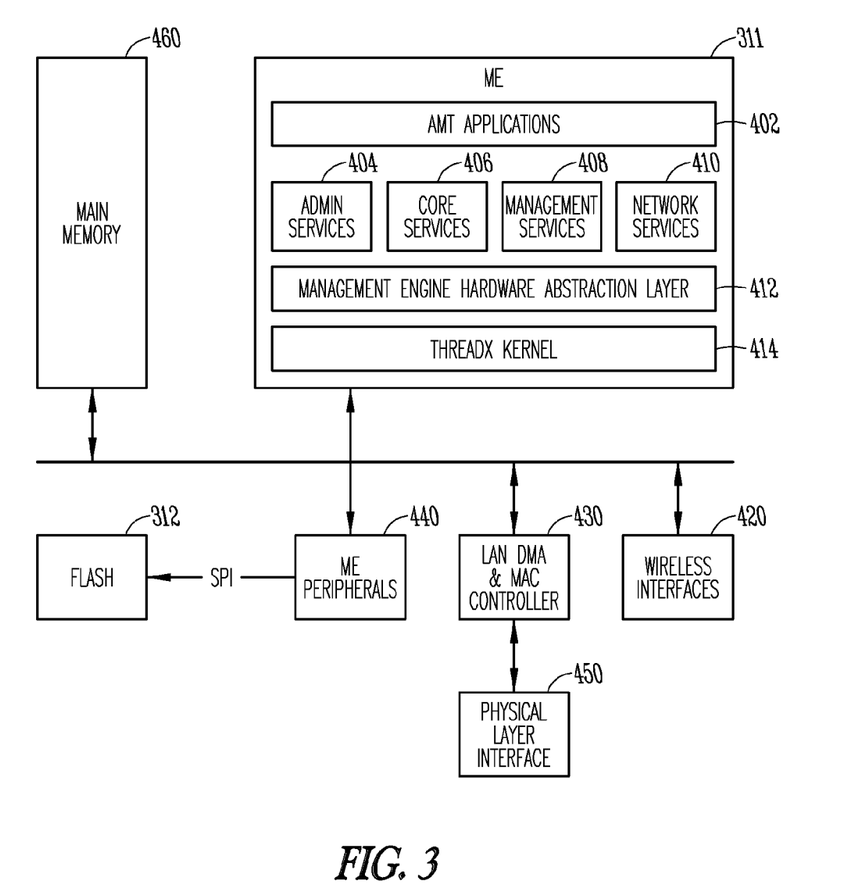

FIG. 3 illustrates a portion of the computer system 300, including the ME 311, which in some embodiments, runs on auxiliary power and is available at multiple system power states. The ME 311 communicates with ME peripherals 440, LAN, Direct Memory Access (DMA) and MAC controller 430, and wireless interfaces 420. Physical layer interface 450 may be coupled with DMA and MAC controller 430. The ME peripherals may include a cryptographic engine, Non-Volatile Memory (NVM), and interfaces to various busses, such as a System-Management Bus (SMBus) or a Serial Peripheral Interface Bus (SPI) bus. As illustrated, the ME peripherals 440 communicates with FLASH memory 312 via a Serial Peripheral Interface (SPI) communication bus. The SPI communication bus allows multiple masters to share a single FLASH device, including use of the information stored in the FLASH memory 312, including the BIOS code, firmware, 3PDS, and so forth.

A specified amount of main memory 460 may be dedicated to execute ME code and store ME run-time data, such as in a manner similar to a Unified Memory Architecture (UMA), which allows a graphics processing unit to share a memory system, or other computer memory architecture enabling shared memory. In some embodiments, the ME 311 stores ME code in a compressed form in FLASH memory 312, and therefore may be accessed without accessing a hard drive (not shown). In such embodiments, the computer system 300 prevents access of the ME memory range by the processing unit 302 (FIG. 2), thus adding security to avoid the ability of malicious software to access the ME code.

The ME 311 can access its dedicated memory space even when the computer system 300 is in a powered down state. The graphics and memory controller hub 308 (FIG. 2) may dynamically switch among various memory power states to allow ME access to FLASH memory 312. This capability allows for low average power since the memory is 'on' only when it is to be used.

As illustrated, ME 311 may also include various firmware and/or software for performing AMT applications 402, administration (ADMIN) services 404, core services 406, management services 408, and network services 410. ME 311 may also include management engine hardware abstraction layer 412 and threadX kernel 414.

Figure 4:
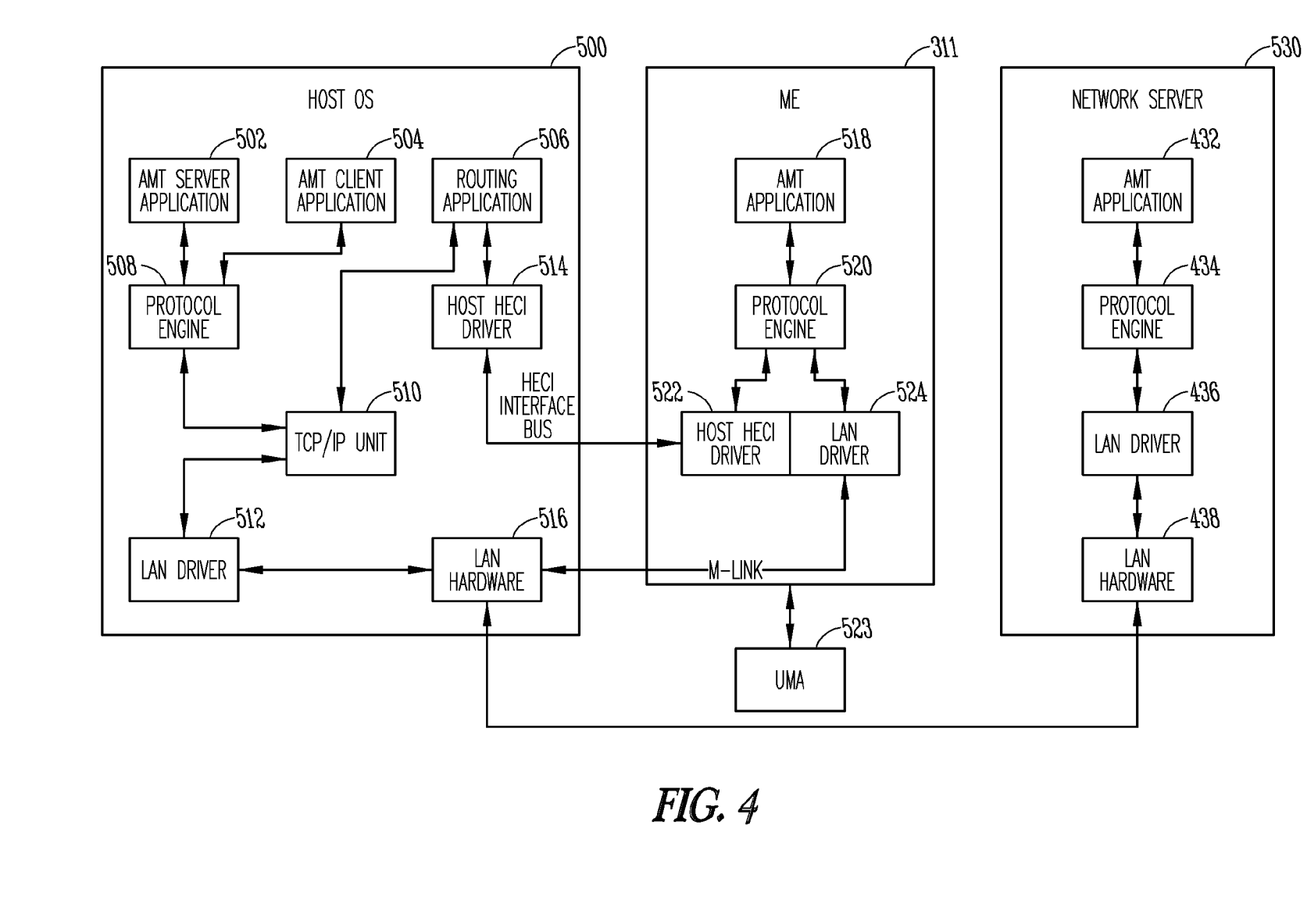

FIG. 4 illustrates an Active Management Technology (AMT) core hardware architecture resident in a computing device in accordance with example embodiments. Communication between the host OS 500 and the ME 311 may be accomplished by a Host Embedded Controller Interface (HECI). The HECI defines a bi-directional communication protocol where either the host OS 500 or the network server 530 may initiate transactions. In one embodiment, the network server 530 implements AMT firmware to initiate transactions. In some embodiments, transactions may be completed asynchronously by the firmware, such as AMT firmware, and then synchronized later.

The ME 311 may employ an external memory, such a memory storage device or system having a UMA type memory architecture. The external UMA memory 523 includes a main memory dedicated to execute ME code for ME 311 and to store ME run-time data for ME 311. The use of the external UMA memory 523 may be similar to UMA memories employed in graphics applications. In some examples, the external UMA memory 523 may include or be located adjacent to a graphics UMA memory space. In this way, the external UMA memory 523 may include an ME memory space and a graphics memory space. From the perspective of the host OS 500, the graphics memory space may appear slightly larger than the ME memory space.

The host OS 500 may include AMT firmware defined by an AMT server application 502, an AMT client application 504, and a routing application 506. A protocol engine 508 controls communications and AMT processing, while a TCP/IP unit 510 controls Transmission Control Protocol (TCP) and Internet Protocol (IP) handling of communications. TCP operates at a high level and provides ordered delivery of data packets and information from source to destination. IP is used to package datagrams or packets from source to destination for communication in a packet-switched network. The suite of protocols for Internet use is referred to as TCP/IP. The protocol engine 508 may be designed to handle multiple protocols, such as Simple Object Access Protocol (SOAP), HyperText Transfer Protocol (HTTP) and Transparent LAN service (TLS). The SOAP protocol is a specification for exchanging structured information to implement web services. SOAP may rely on application layer protocols for process-to-process communications, such as Remote Procedure Call (RPC) or HTTP, for message negotiation and transmission. TLS is a service linking networks, such as remote Ethernet networks. TLS allows the connected networks to be viewed as one contiguous network from the user perspective.

Additionally, the host OS 500 includes a host HECI driver 514 as well as a LAN driver 512 and LAN hardware 516. The host HECI driver 514 provides an interface for the HECI interface or HECI bus that allows the host OS 500 to communicate directly with the ME 311. The bi-directional, variable data rate bus enables communication of system management information and events. The bus may be implemented with four wires, a request and grant pair along with a serial transmit and receive data pair. The LAN driver 512 and LAN hardware 516 provide an interface for the host OS 500 and the ME 311.

FIG. 4 further illustrates the ME 311 as including an AMT application 518, a protocol engine 520, a host HECI driver 522, and a LAN driver 524. The host HECI driver 522 operates in a complementary manner to the host HECI driver 514, communicating over the HECI interface bus. The LAN driver 524 communicates with the LAN hardware 516 through a serial link such as an M-link.

The host OS 500 further communicates with the network server 530 via a connection between LAN hardware 516 and LAN hardware 438. The network server 530 also includes an AMT server application 432, a protocol engine 434, and a LAN driver 436. The protocol engines 520 and 434 are similar to the protocol engine 508, and may provide complementary functions.

Message flow between a first client pair may continue without regard to the message flow between a separate client pair. Messages may be of various lengths, and may be subject to the limitations of the user's receive buffer (rather than limitations of the HECI drivers). The HECI drivers 514 and 522 may comprise software or firmware drivers, which break messages into packets to support lengthy messages. Flow control is communicated by HECI bus messages, and the HECI driver may wait to transmit a message until an associated client has a receive buffer ready to accept the data.

A FLASH memory, such as FLASH memory 312 (FIG. 3), associated with AMT is shared by multiple masters (Host, ME, and LAN). The FLASH memory 312 is a non-volatile memory, wherein FLASH refers to the ability to electrically erase and program large blocks of the memory array at the same time. The FLASH memory 312 maintains information stored without requiring power. The FLASH protection scheme does not allow any master to perform a direct write to FLASH, and read/write permissions to each FLASH region are enforced in hardware. Each master has a grant Override register that can override its descriptor permissions, giving other masters access to the region they own. A security-override strap is used during initial manufacturing and service returns to program (or re-program) the FLASH memory 312.

Figure 5:
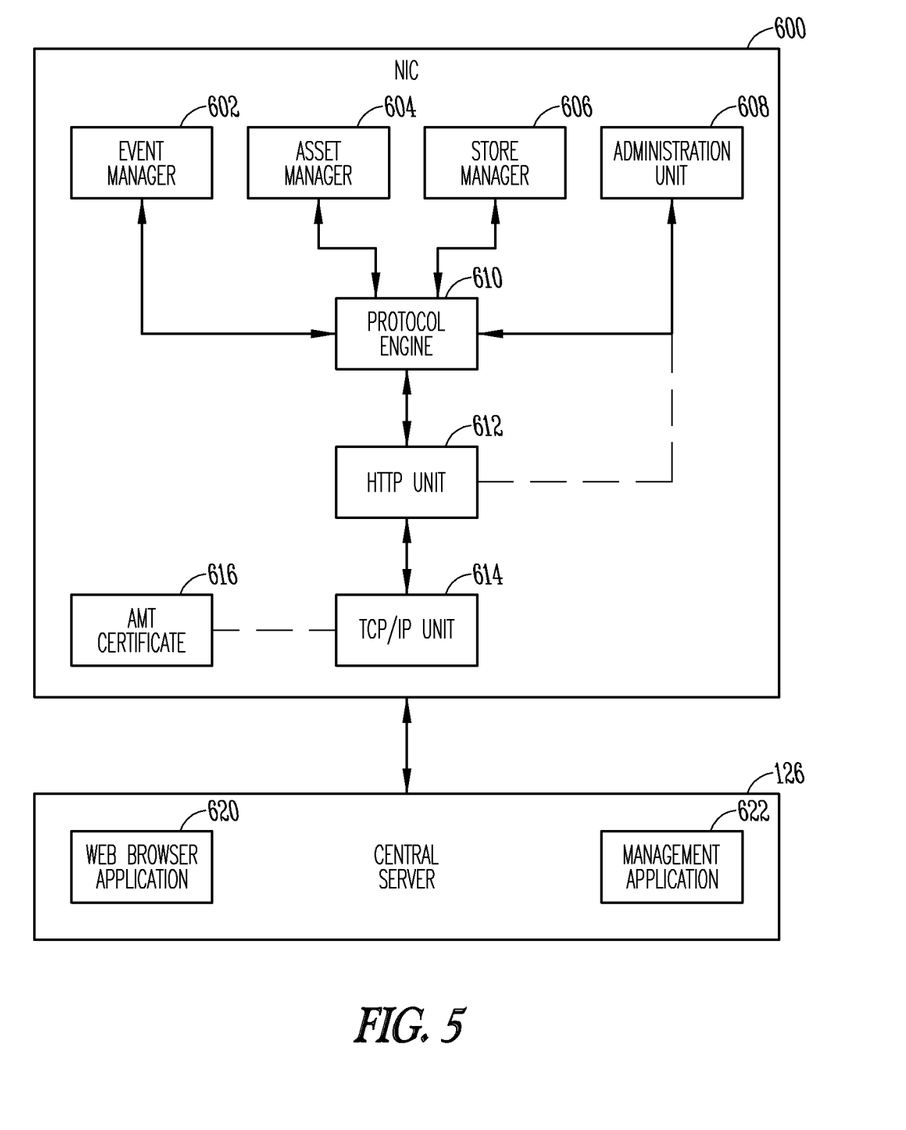

FIG. 5 illustrates an example of a Network Interface Controller (NIC) 600, which may be used in a system employing an AMT architecture. The NIC 600 implements an interface that is OS-independent. The NIC 600 includes an event manager 602, an asset manager 604, a store manager 606 and an administration unit 608. The NIC 600 further includes a protocol engine 610, which implements a SOAP-based application programming interface (API) consistent with a Web Services Description Language (WSDL). The NIC 600 also includes an HTTP unit 612 and a TCP/IP unit 614. In some embodiments, each service supported by the NIC 600 is provided by a distinct WSDL file. Security measures for the network interface may include the use of HTTP Digest, such as defined in Request For Comments (RFC) 2617, entitled "HTTP Authentication: Basic and Digest Access Authentication," by J. Franks et al, dated June 1999, promulgated by the Internet Engineering Task Force, and authentication by username/password credentials. The NIC 600 also supports TLS-secured connections and mutual authentication. The NIC 600 includes an AMT certificate 616 and an administration unit 608. As illustrated in FIG. 5, the NIC 600 interfaces with the central server 126 including a web browser application 620 and a management application 622.

Figure 6:
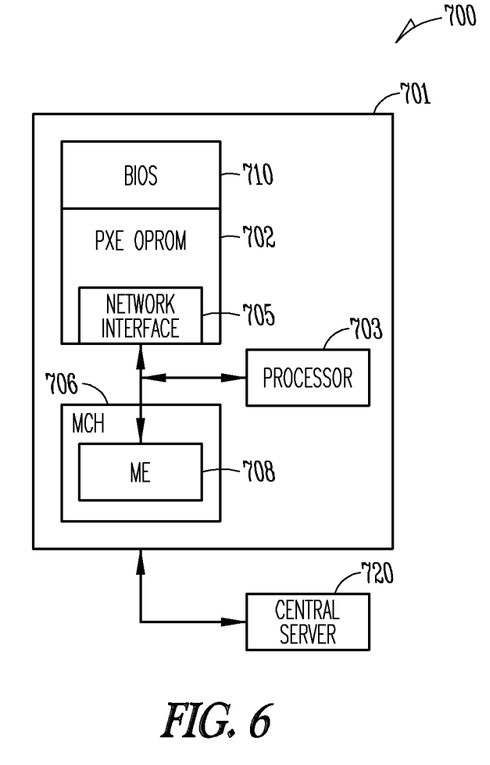
FIGS. 6 and 7 illustrate configurations of a computer system in accordance with some example embodiments.

FIG. 6 is a block diagram illustrating a network configuration 700 including a central server 720 and a computing device 701 having access to a wireless network. The computing device 701 further includes a processor 703 controlling operation of the computing device 701, including to run code, such as firmware or software, resident in the ME 708 and resident or received into the BIOS 710. As illustrated, the computing device 701 has a firmware portion having a BIOS 710, a PXE memory, such as PXE Option Read Only Memory (OPROM) 702, a network interface 705. The PXE OPROM 702 provides code to enable PXE for the computing device. The network interface 705 interacts with the ME 708 of Memory Controller Hub (MCH) 706.

The network interface in one example is an HECI API. The HECI API provides a software interface that is used to communicate to MCH 706 including an ME 708 so as to access AMT capabilities. Communication between the local host operating system (OS) and the ME 708 is accomplished by means of a HECI driver. The HECI function operates bi-directionally, as either the host OS or AMT firmware can initiate transactions.

The computing device 701 operationally may boot up from the central server 720 or a wireless network. The ME 708 implements AMT functionality for the computing device.

According to an example embodiment, when an option is set to enable PXE and the wireless interface is set by the remote IT console to enable AMT, the ME 708 continues to have full control of the WLAN interface and connection even when the computing device 701 starts booting. The ME 708 may relinquish control of the WLAN interface after a PXE timeout or on receipt of HECI commands to de-initialize or shut down. The commands may be received from BIOS 710 or PXE OPROM 702. The BIOS 710 or PXE OPROM 702 may directly use the network interface 705, such as a HECI API, to communicate with the ME 708 to send and receive the network traffic over the WLAN (not shown in FIG. 6). The network interface 705 will serve as a proxy or virtual interface for the WLAN interface that is managed by the ME 708. The ME 708 will have full control of the WLAN interface and authentication exchange until the time the system boots.

In an example embodiment, the network interface is consistent with the HECI protocol, having commands given in Table I in accordance with some example embodiments. The HECI protocol includes call made to the ME to initiate AMT actions.

TABLE I

HECI Protocol

| HECI CALL | DEFINITION |
|---|---|
| HECI INITIALIZE | Signals the ME to initialize the WLAN interface, based on Wi-Fi profile that is pre-provisioned and take control of the WLAN interface/connection. |
| HECI DEINITIALIZE | Signals the ME to relinquish control of the WLAN connection; this is where the wireless LAN connection is transitioned back to the host. |
| HECI OPEN | Signals the ME to open the WLAN interface. |
| HECI CLOSE | Signals the ME to close the WLAN interface. |
| HECI TX | Signals the ME to transmit a packet over the WLAN interface. |

TABLE I-continued

HECI Protocol

| HECI CALL | DEFINITION |
|---|---|
| HECI RX | Signals the ME to call a receive packet handler when a packet is received over the WLAN interface (interrupt driven). |
| HECI POLL | This call polls the ME to find out if a packet has been received over the WLAN interface. |

Figure 7:
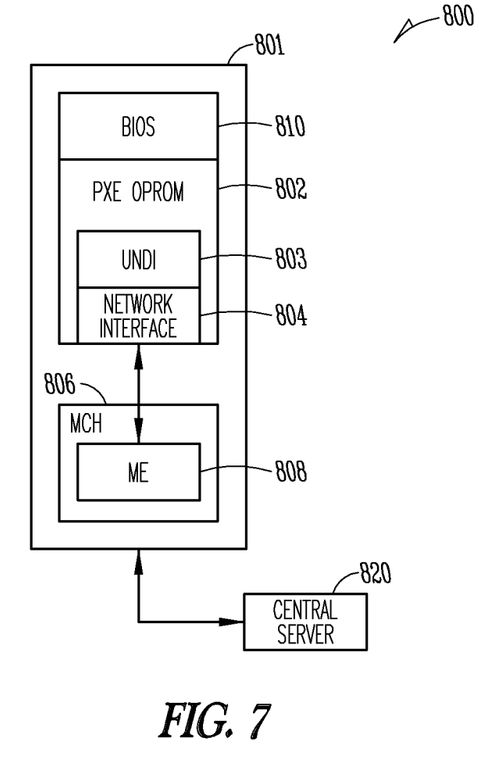

FIG. 7 is a block diagram illustrating a network configuration 800 including a central server 820 and a computing device 801 having access to a wireless network. In one example, the computing device 801 includes a BIOS 810, a PXE OPROM 802, a UNDI (Universal Network Driver Interface) 803 and a network interface 804. The UNDI 803 is defined in a PXE specification, and acts as the HECI wrapper. The BIOS 810 and the PXE OPROM 802 use the UNDI 803 to communicate with the ME 808 in order to send and receive network traffic over the WLAN (not shown). The network interface 805 interacts with the ME 808 of MCH 806. The UNDI 803 internally uses the network interface 804, such as defined in Table I to talk with the ME 808. The UNDI 803 supports the AMT functionality while providing flexibility and ease of integration with a variety of technologies for implementing the PXE OPROM 802. Table II defines the actions in operation of UNDI 803 in accordance with some example embodiments.

TABLE II

UNDI Protocol

| UNDI ACTION | DESCRIPTION |
|---|---|
| UNDI STARTUP | This is the UNDI API responsible for initializing the contents of the UNDI code and data segment for proper operation. Information from the PXE structure and the first PXENV_START_UNDI API call is used to complete this initialization. The rest of the UNDI APIs will not be available until this call has been completed. |
| UNDI CLEANUP | The call prepares the network adapter driver to be unloaded from memory. This call is made just before unloading a universal NIC Driver. The rest of the API is not available after this call executes. |
| UNDI INITIALIZE | This call resets the adapter (i.e., the NIC) and programs it with default parameters. The default parameters are those supplied in response to the most recent UNDI_STARTUP call. The application calls PXENV_UNDI_OPEN to logically connect the network adapter to the network. This call is made by an application to establish an interface to the network adapter driver. Note: When the PXE code makes this call to initialize the network adapter, it passes a NULL pointer for the Protocol field in the parameter structure |
| UNDI RESET ADAPTER | This call resets and reinitializes the network adapter with the same set of parameters supplied to Initialize Routine. Unlike Initialize, this call opens the adapter; that is, it connects logically to the network. This routine cannot be used to replace Initialize or Shutdown calls. |
| UNDI SHUTDOWN | This call resets the network adapter and leaves it in a safe state for another driver to program it. Note: The contents of the PXENV_UNDI_STARTUP parameter structure need to be saved by the universal NIC Driver in case PXENV_UNDI_INITIALIZE is called again. |
| UNDI OPEN | This call activates the adapter's network connection and sets the adapter ready to accept packets for transmitting and receiving. |
| UNDI CLOSE | This call disconnects the network adapter from the network. Packets cannot be transmitted or received until the network adapter is open again |
| UNDI TRANSMIT PACKET | This call transmits a buffer to the network. The media header for the packet can be filled by the calling protocol, but it might not be. The network adapter driver will fill it if required by the values in the parameter block. The packet is buffered for transmission provided there is an available buffer, and the function returns PXENV_EXIT_SUCCESS. If no buffer is available the function returns PXENV_EXIT_FAILURE with a status code of PXE_UNDI_STATUS_OUT OF_RESOURCE. The number of buffers is implementation-dependent. An interrupt is generated on completion of the transmission of one or more packets. A call to |

TABLE II-continued

UNDI Protocol

| UNDI ACTION | DESCRIPTION |
|---|---|
| | PXENV_UNDI_TRANSMIT is permitted in the context of a transmit complete interrupt |
| UNDI ISR | This API function will be called at different levels of processing the interrupt. The FuncFlag field in the parameter block indicates the operation to be performed for the call. This field is filled with the status of that operation on return. |

Figure 8:
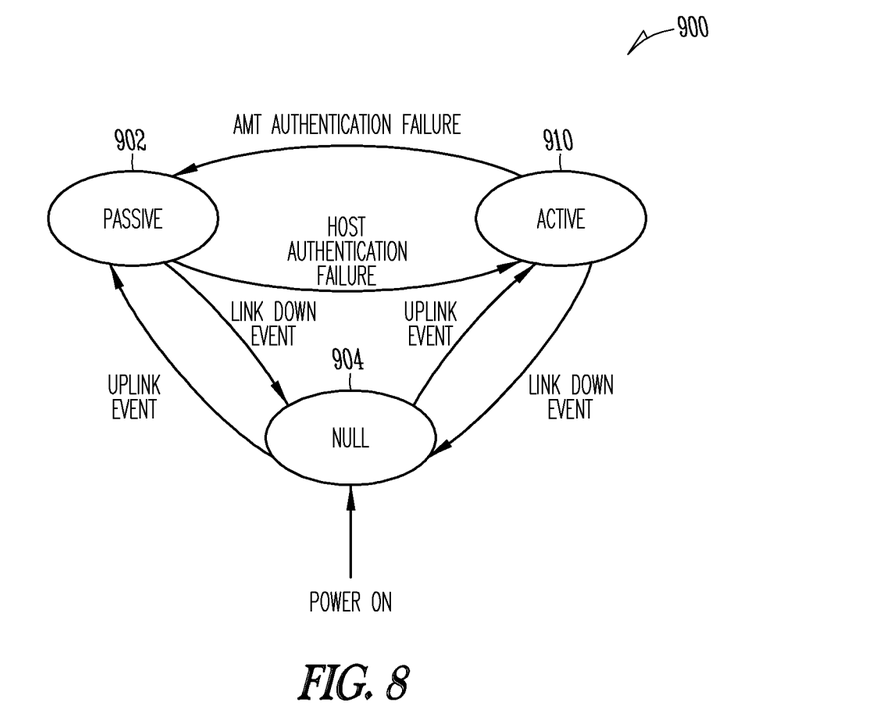
FIG. 8 is a state diagram illustrating various states of the computer system in accordance with some example embodiments.

FIG. 8 illustrates a state diagram 900 including a method for operating a computing device having connection to a central server and to a wireless network. As illustrated, the computing device powers on and enters the null state 904. On occurrence of various events transitions the computing device either to an active state 910 where the device downloads software and a system image to boot the computing device or to a passive state 902 where the device downloads software and a system image to boot the computing device.

From the null state 904 on an uplink event for the central server on a networked connection, considered an uplink event, the computing device transitions to the active state 910. An uplink event, for example, may be the detection of a connection to a network, such as an Ethernet network. In this way, when the computing device initially connects to the network, a connection is detected as an uplink event. Further while in the null state 904, on an uplink event for the wireless network, the computing device transitions to the passive state 902. The uplink event may be when the computing device detects the wireless network, or when the wireless capability of the computing device is turned on. Other uplink events may be implemented according to the computing environment and system configurations.

From the active state 910, on a link down event, the computing device transitions back to the null state 904. Further, when authentication to the central server fails, such as when the central server implements an AMT mechanism and transitions to the passive state 902, the computing device may also transition back to the null state 904.

From the passive state 902, on a link down event the computing device transitions to the null state 904. When the computing device fails to authenticate on the wireless network host, the computing device then transitions to the active state 910.

Figure 9:
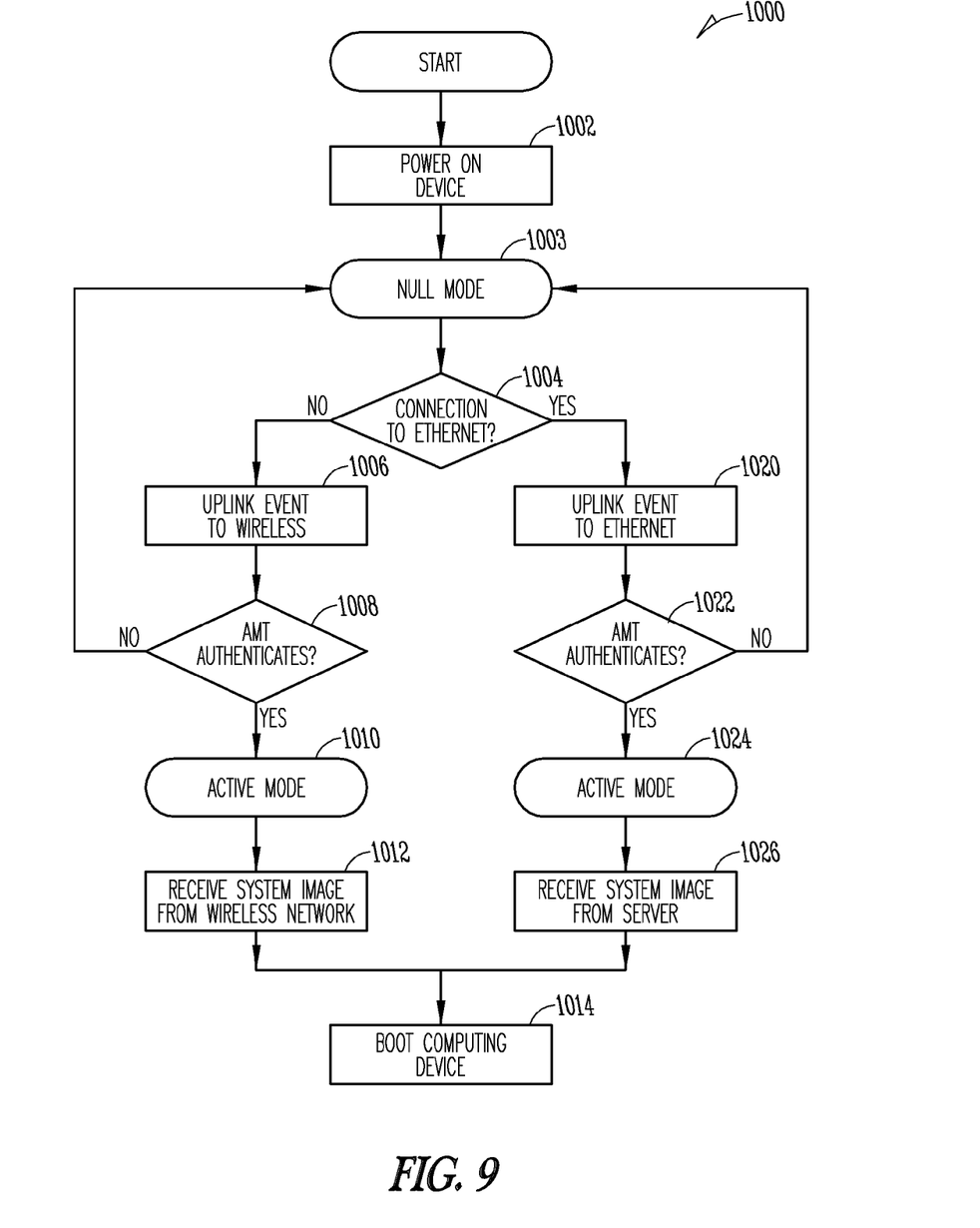
FIG. 9 is a flow diagram illustrating methods for booting a computer system at power up, in accordance with some example embodiments.

FIG. 9 is a flowchart illustrating a method 1000 for managing booting up of an operating system in a computing device. The computing device powers on 1002 and enters a null mode 1003, which corresponds to a pre-boot mode of an operating system for the computing device. At decision point 1004 determines if the computing device has a network connection, such as an Ethernet connection. For a network connection, on an uplink event 1020, the computing device attempts to authenticate and connect on a central server. When the computing device authenticates 1022 on the Network connection the computing device enters an active mode 1024, else the computing device remains in null mode 1003. In the active mode 1024, the computing device loads software onto the computing device from the central server. The computing device receives the system image 1026 from the central server, and uses this information to boot up 1014 the computing device.

Returning to decision point 1004, when a network connection is not available, the computing device receives an uplink event to the wireless network, which is referred to as a host server. At decision point 1008, when the computing device authenticates on the wireless network, an uplink event is processed 1006 and the computing device enters a passive mode 1010 in which the device will boot from the wireless network. The computing device receives 1012 system image information from the wireless network, and uses this information to boot 1014 the computing device. If the computing device fails to authenticate at decision point 1008, the computing device remains in the null mode 1003.

Both embodiments involve the ME 708 (FIG. 6) and 808 (FIG. 8) relinquishing control of a NIC after the computing device has booted. The triggers used by ME 708, 808 to relinquish control to the host OS after boot include a configurable timeout for the HECI processing or UNDI API triggers (e.g., calls to DEINITIALIZE or SHUTDOWN). When the platform of the computing device is connected to both a LAN, such as LAN 120 shown in FIG. 1, and a WLAN, such as the wireless network 122 also shown in FIG. 1, one of the networks will be used for PXE boot. In some embodiments, connection to the LAN and the WLAN is mutually exclusive at this point. Processing may be based on the Set8021XPXEEnable interface used with a wired or a wireless interface.

In an example embodiment, the PXE information stored in the computing device, such as PXE OPROM 702 and 802 is used to support AMT and remote connections to the wireless network. In one example, API activities are performed to configure PXE support with AMT implementing a wireless network. In one example, the computing device issues a call to Set8021XPXEEnable_WLAN. The PXE timeout period is set to a default value of 120 seconds. The API sets the PXE_WLAN_Config_flag in the AMT firmware. The computing device then issues a call to Get8021XPXEEnable_WLAN The host booting procedures transitions according to and may be implemented using the following code:

If (PXE_WLAN_Config_flag && !(PXE_boot_complete))
    {
    AMT continues in active mode until the remote boot is completed.
    }

PXE boot completes on detection of any of the PXE features of Table III, i.e., HECI trigger, 802.1x/EAP packets, or PXE timeout. In response the computing device sets PXE_boot_complete flag in the AMT firmware.

TABLE III

| PXE Features | | |
|---|---|---|
| PXE Algorithm Feature | Vulnerability | Security |
| 1. HECI API Trigger to ME-> HECI DEINIT or UNDI SHUTDOWN | HECI is uninstalled or disabled in host OS image | Make sure AMT goes in passive mode once PXE boot complete |
| 2. Configurable PXE boot timeout -> 120 seconds (default value) | | Makes sure AMT goes in passive mode after timeout |
| 3. PXE boot detection acc to PXE 2.1 spec (DHCP-PXE extension or TFTP packet) CB filter alert-> If PXE boot not detected for 30 seconds, AMT in passive mode | | Faster timer, Makes sure AMT goes in passive mode after timeout |

In some embodiments, a machine-readable medium is comprised of instructions, which when implemented by one or more machines, cause the one or more machines to receive a registration request from a service provider, store a set of information for the service provider in a memory storage unit, and transmit an indication of the service provider to at least one service consumer in the wireless communication network.

Unless specifically stated otherwise, terms such as "processing," "computing," "calculating," "determining," "displaying," or the like, may refer to an action and/or process of one or more processing or computer systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or non-volatile memory or a combination thereof.

Embodiments may be implemented in one or a combination of hardware, firmware, and software. Embodiments may also be implemented as instructions stored on a machine-readable medium, which may be read and executed by at least one processor to perform the operations described herein. A machine-readable medium may include any mechanism for storing or transmitting information in a form readable by a machine (e.g., a computer). A machine-readable medium may include, but is not limited to, FLASH memory, optical disks, Compact Disks-Read Only Memory (CD-ROM), Digital Versatile/Video Disks (DVD), Read Only Memory (ROM), Random Access Memory (RAM), Erasable Programmable Read-Only Memory (EPROM), Electrically Erasable Programmable Read-Only Memory (EEPROM), magnetic or optical cards, propagation media or other type of machine-readable media suitable for storing electronic instructions. For example, embodiments may be downloaded as a computer program, which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment. Therefore, it should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments.

Similarly, it should be appreciated that in the foregoing description of embodiments, various features are sometimes grouped together in a single embodiment, figure, or description thereof for the purpose of streamlining the disclosure, in order to aid in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Having disclosed embodiments and the best mode, modifications and variations may be made to the disclosed embodiments while remaining within the scope of the embodiments as defined by the following claims.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus, comprising:
    a memory storage device to store a first set of computer-readable instructions to load an operating system on the apparatus; and
    a Management Engine (ME) to
        maintain full control of a wireless interface and a wireless connection at a beginning of a secure authenticated remote boot of the apparatus over a wireless network in a pre-boot execution environment (PXE) using active management technology (AMT) for remote discovery,
        relinquish control of the wireless interface after a PXE timeout, in response to a shutdown command, or once the device has booted, and
        control use of an operating system received from a remote location.

2. The apparatus of claim 1, further comprising a host embedded controller interface (HECI) application programming interface (API) to communicate with the ME for communicating over the wireless connection, the HECI API to serve as a proxy for the wireless interface when managed by the ME.

3. The apparatus of claim 1, further comprising a universal network driver interface (UNDI) as a host embedded controller interface (HECI) wrapper, the PXE to use the UNDI to communicate with the ME for communicating network traffic over the wireless connection.

4. The apparatus of claim 1, wherein the apparatus is configured to communicate wirelessly in accordance with an IEEE 802.11 standard.

5. The apparatus of claim 1, wherein the apparatus is configured to communicate wirelessly in accordance with an IEEE 802.16 standard.

6. The apparatus of claim 1, wherein the apparatus is configured to communicate wirelessly in accordance with a 3GPP standard for long-term evolution (LTE).

7. The method of claim 1, wherein the computing device is a wireless communication device configured to communicate in accordance with one or more of an IEEE 802.11 standard, an IEEE 802.16 standard, and a 3GPP standard for long-term evolution (LTE).

8. A system comprising:
one or more antennas to communicate over a wireless network with a remote system;
a memory to store a first set of computer-readable instructions for loading an operating system; and
one or more processors to perform a secure authenticated remote boot of the system over the wireless network in a pre-boot execution environment (PXE) using active management technology (AMT) for remote discovery by executing functionalities of a Management Engine (ME), the functionalities including
maintaining full control of a wireless interface and a wireless connection at a beginning of a secure authenticated remote boot of the apparatus over a wireless network in a pre-boot execution environment (PXE) using active management technology (AMT) for remote discovery,
relinquishing control of the wireless interface after a PXE timeout, in response to a shutdown command, or once the device has booted, and
controlling use of an operating system received from the remote system.

9. The system of claim 8, wherein the one or more processors are further configured to implement functionalities of:
a host embedded controller interface (HECI) application programming interface (API) to communicate with the ME for communicating over the wireless connection, the HECI API to serve as a proxy for the wireless interface when managed by the ME; and
a universal network driver interface (UNDI) as a host embedded controller interface (HECI) wrapper, the PXE to use the UNDI to communicate with the ME for communicating network traffic over the wireless connection.

10. The system of claim 8, wherein the system includes a wireless communication device configured to communicate in accordance with an IEEE 802.11 standard.

11. The system of claim 8, wherein the system includes a wireless communication device configured to communicate in accordance with an IEEE 802.16 standard.

12. The system of claim 8, wherein the system includes a wireless communication device configured to communicate in accordance with a 3GPP standard for long-term evolution (LTE).

13. A non-transitory computer-readable medium comprising instructions that, when executed on a computing device, cause the computing device to perform a secure authenticated remote boot of the computing device over the wireless network in a pre-boot execution environment (PXE) using active management technology (AMT) for remote discovery by:
maintaining full control by a management engine (ME) of a wireless interface and a wireless connection as booting begins; and
relinquishing control of the wireless interface by the ME after a PXE timeout, in response to a shutdown command, or once the device has booted, wherein the ME is to control use of an operating system received from a remote location.

14. The non-transitory computer-readable medium of claim 13, further comprising instructions that, when executed on a computing device, cause the computing device to:
use a host embedded controller interface (HECI) application programming interface (API) to communicate with the ME for communicating over the wireless connection, the HECI API to serve as a proxy for the wireless interface when managed by the ME; and
use a universal network driver interface (UNDI) as a host embedded controller interface (HECI) wrapper, the PXE to use the UNDI to communicate with the ME for communicating network traffic over the wireless connection.

* * * * *